(12) United States Patent
Schneider

(10) Patent No.: US 9,237,149 B2
(45) Date of Patent: Jan. 12, 2016

(54) CERTIFICATE BASED DISTRIBUTED POLICY ENFORCEMENT

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1137 days.

(21) Appl. No.: 12/395,421

(22) Filed: Feb. 27, 2009

(65) Prior Publication Data

US 2010/0223675 A1    Sep. 2, 2010

(51) Int. Cl.
*H04L 9/32* (2006.01)
*H04L 29/06* (2006.01)
*G06F 21/10* (2013.01)
*G06F 21/64* (2013.01)
*G06F 21/62* (2013.01)

(52) U.S. Cl.
CPC ............ *H04L 63/0823* (2013.01); *G06F 21/10* (2013.01); *G06F 21/6209* (2013.01); *G06F 21/64* (2013.01); *H04L 63/10* (2013.01)

(58) Field of Classification Search
CPC ................................ G06F 21/10; G06F 21/64
USPC .......................................................... 726/27
See application file for complete search history.

(56) References Cited

U.S. PATENT DOCUMENTS

| | | | |
|---|---|---|---|
| 7,171,558 B1* | 1/2007 | Mourad et al. | 713/168 |
| 7,533,385 B1* | 5/2009 | Barnes | 718/104 |
| 7,549,060 B2* | 6/2009 | Bourne et al. | 713/193 |
| 2005/0027723 A1* | 2/2005 | Jones et al. | 707/100 |
| 2008/0313699 A1 | 12/2008 | Starostin et al. | |
| 2008/0313733 A1 | 12/2008 | Kramer et al. | |
| 2009/0106840 A1* | 4/2009 | Dreymann et al. | 726/23 |
| 2009/0138486 A1* | 5/2009 | Hydrie et al. | 707/10 |

OTHER PUBLICATIONS

RFC 3076, Canonical XML Version 1.0, Mar. 2001, Retrieved from the Internet <URL: tools.ietf.org/html/rfc3076>, pp. 1-29, as printed.*

Ned Batchelder, Evil Apple, 2008, Retrieved from the Internet <URL: nedbatchelder.com/blog/200809/evil_apple.html>, pp. 1-3 as printed.*

Zhang et al.; Role-based Access Control in Online Authoring and Publishing Systems vs. Document Hierarchy; 1999; Retrieved from the Internet <URL: dl.acm.org/citation.cfm?id=318594>; pp. 1-6 as printed.*

* cited by examiner

*Primary Examiner* — Michael Chao
(74) *Attorney, Agent, or Firm* — Lowenstein Sandler LLP

(57) ABSTRACT

An apparatus and a method for a certificate-based distributed policy system is described. A policy server receives over a communication channel a data structure associated with an object to be managed across a communication boundary between a client and the policy server. The policy server generates an object certificate upon validation of the object and validation of an initiator of the object. The data structure includes a serialized representation of public properties of the object, a hash of the object in a canonical serialized form, and a signature of the public properties and hash using the initiator's private key.

20 Claims, 7 Drawing Sheets

CERTIFICATE BASED DISTRIBUTED POLICY ENFORCEMENT

TECHNICAL FIELD

Embodiments of the present invention relate to computing systems, and more particularly, to distributed policy enforcement.

BACKGROUND

Information right management systems enable information to be protected after it has been accessed by or delivered to an authorized individual. They typically use persisten usage policies which remain with information when that information is transferred.

For example, consider a sender who wishes to send an email message that contains confidential information to a group of selected recipients. Using an information rights management system enabled email application, such as those currently known, the sender is able to select a template to specify that recipients may read the email message but not copy, paste, edit or forward that message. When the recipients receive the email message they are able to view it using the email application. The email application enforces the permissions so that the recipients are unable to copy, paste, edit or forward the message. Existing information rights management systems also enable other policies to be used. For example, the sender might set a time limit after which the recipients are no longer able to view the email.

These types of restrictions can also be applied to intranet content and electronic documents using known information rights management systems. As such, existing information rights management systems can only be applied in limited situations. It would be desirable to have a unified framework that both manages objects that cross a security boundary and managing attributes of objects existing within a single, well-defined security boundary.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for a certificate-based distributed policy system is described. In one embodiment, a policy server receives over a communication channel a data structure associated with an object to be managed across a communication boundary between a client and the policy server. The policy server generates an object certificate upon validation of the object and validation of an initiator of the object. The data structure includes a serialized representation of public properties of the object, a hash of the object in a canonical serialized form, and a signature of the public properties and hash using the initiator's private key.

In the context of the present application, objects can be any structured collection of data, email messages, voicemail messages, database records, etc. In one embodiment, public key cryptography is used. In the following discussion, it is assumed that all parties have access to a managed PKI, and each party has its own private key, associated with a public key that is available to all parties.

Figure 1:
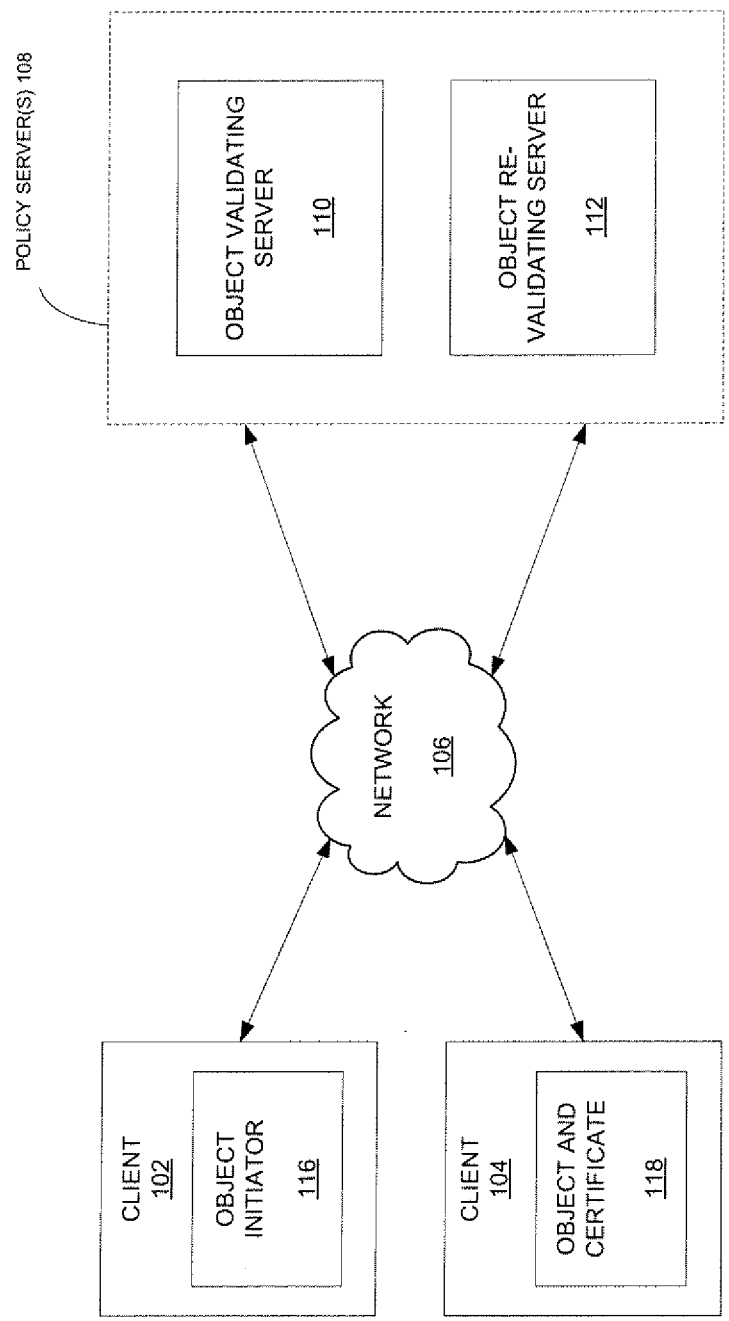
FIG. 1 is a block diagram illustrating one embodiment of a system for certificate-based distributed policy enforcement.

FIG. 1 is a block diagram illustrating one embodiment of a certificate-based distributed policy system. The system includes clients 102, 104 that communicate with one or more policy server 108. Clients 102, 104 can be any type of computer device including a desktop computer, laptop computer, handheld computer, console device or similar computing device. Similarly, policy server 108 can be any type of computer device including a desktop computer, laptop computer, handheld computer, console device or similar computing device. In one embodiment, policy server 108 includes two servers: an object validating server 110, and an object re-validating server 112. The object validating server 110 is configured to generate and issue an object certificate while the object re-validating server 112 is configured to verify the validity of the object certificate. In another embodiment, both servers 110, 112 may be included in one or more policy servers 108.

Client 102 and server 106 can communicate over a network 104. Network 104 can be a wide area network (WAN), such as the Internet, a local area network (LAN) or similar network. Network 104 can include any number of computers and network devices. Network 104 can include any combination of wired and wireless communication lines and devices. The communication channel between clients 102, 104 and policy server 108 may be secure or insecure. As such, a communication boundary may exist between clients 102, 104 and policy server 108.

In one embodiment, client 102 includes an object initiator 116. Client 104 includes an object and an object certificate 118 to be validated. Client 102 can execute any number of applications or other programs that can interact with or utilize these components. For sake of clarity, these applications and programs are omitted from the illustration and discussion. One of ordinary skill in the art would understand that applications and programs would be inter-operable with the described aspects of the embodiments of the invention. The operations between clients 102, 104 and policy server 108 are described in more detail below.

Figure 2:
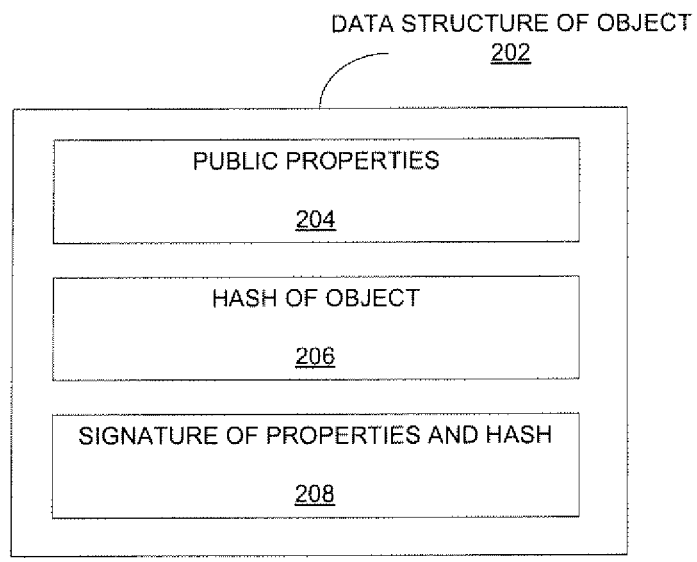
FIG. 2 is a block diagram illustrating one embodiment of a data structure of an object to be managed.

FIG. 2 is a block diagram illustrating one embodiment of a data structure of an object to be managed. The association process begins when the object first enters the policy boundary (for example, when an email message is received from outside, or when a database record is first created). The object's initiator assembles a data structure 202 related to the object with a serialized representation 204 of the public properties of the object. These properties must include the type of the object, any requested policy associations (for example, user, role, and group assignment requests, specific capabilities or restrictions, etc.), and the lifespan of the object (which can be absolute—"expires on 1 Jan. 2050 at midnight", or relative to some event—"until the associated user logs out", or "until the associated employee is no longer employed, plus five years", for example). Data structure 202 also includes a hash 206 of the object in a canonical serialized form—this serialized form must be unique and unambiguous; given any particular object, it must always have the same serialized form. Last, data structure 202 includes a signature of the properties and hash, using the initiator's private key.

Figure 3:
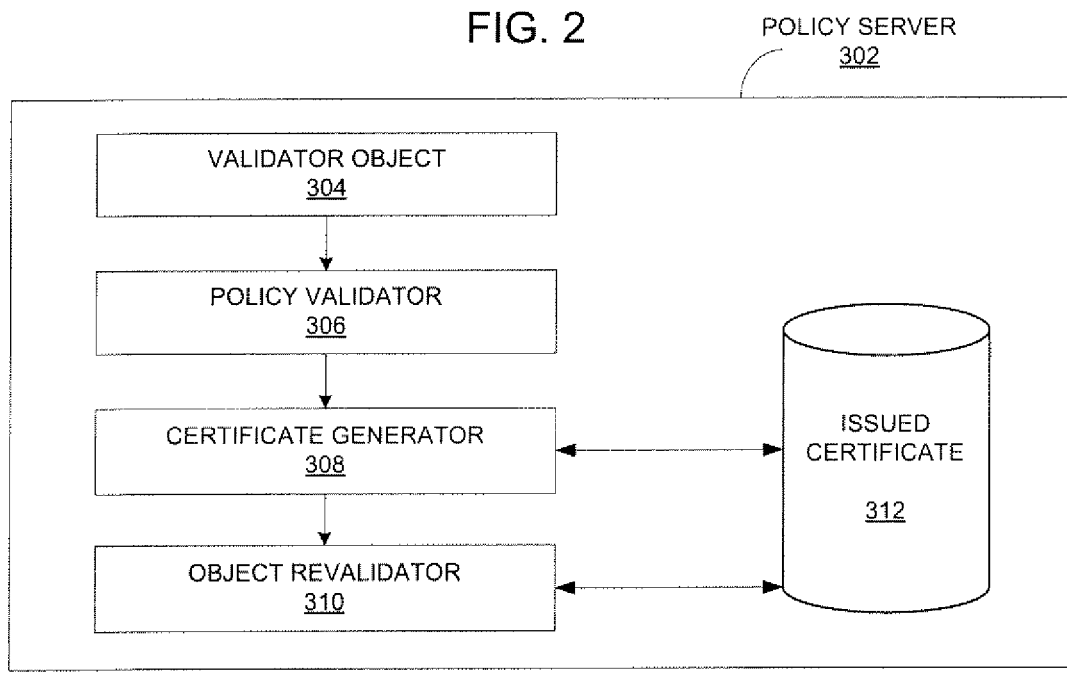
FIG. 3 is a block diagram illustrating one embodiment of a policy server.

FIG. 3 is a block diagram illustrating one embodiment of a policy server 302. Policy server 302 includes an object validator 304, a policy validator 306, a certificate generator 308, an object re-validator 310, and a storage 312 for previously issued certificates. In another embodiment, policy server 302 may be split into two discrete entity types—object validating server (which issue certificates) and object revalidating server (which look up object properties based on a previously issued certificate).

The initiator provides data structure 202 to policy server 302 (using either a secure or insecure communication channel, as required by the object's type and local policy). Depending on the object's type, policy server 302 may require that the initiator also forward the object in its canonical serialized form.

Validator object 304 then validated that the initiator has the capabilities required to originate an object of the requested type. Policy server 302 may also require the object itself (or its canonical serialized form) to perform further policy checks (for example, scanning for malware, objectionable content, security policy violations, etc).

If policy server 302 decide that the object is valid, policy validator 306 then determines which policy requests to grant. Once that decision is made, certificate generator 308 records the object's hash, the object initiator's unique identity, and the policies associated with the object. Certificate generator 308 then associates a unique serial number with the object, and returns a certificate consisting of the serial number, the original hash, and its signature of these two items. This can be accommodated in an X. 509 certificate—the hash becomes part of the subjectName element, and the serial number and signature are native parts of the certificate. The subjectPublicKey element could be null, or it could be the public key of the object initiator.

The generated certificate also may be stored in storage 312. The certificate is used as a unique identifier of the object. Recipients then use the identifier to query policy servers for object properties, which includes checking policy constraints on the object. The object itself may not be needed by all recipients, in which case the certificate may serve as a proxy for the object. Every recipient must validate every object it receives against the policy servers. However, a recipient is permitted to cache the results of an earlier validation request, provided the exact same object is being presented for the exact same operation.

If the object is invalid or violates policy, policy server 302 does not provide an object certificate.

Object revalidator 310 looks up object properties based on a previously issued certificate in storage 312. In accordance with another embodiment, an object validating server can consult other servers or services in connection with validating the object. In particular, it may consult separate virus and malware scanners, web content filters, spam filters, etc.

Using X.509 certificates for the objects would also let the policy server revoke an object's certificate, invalidating an object.

Figure 4:
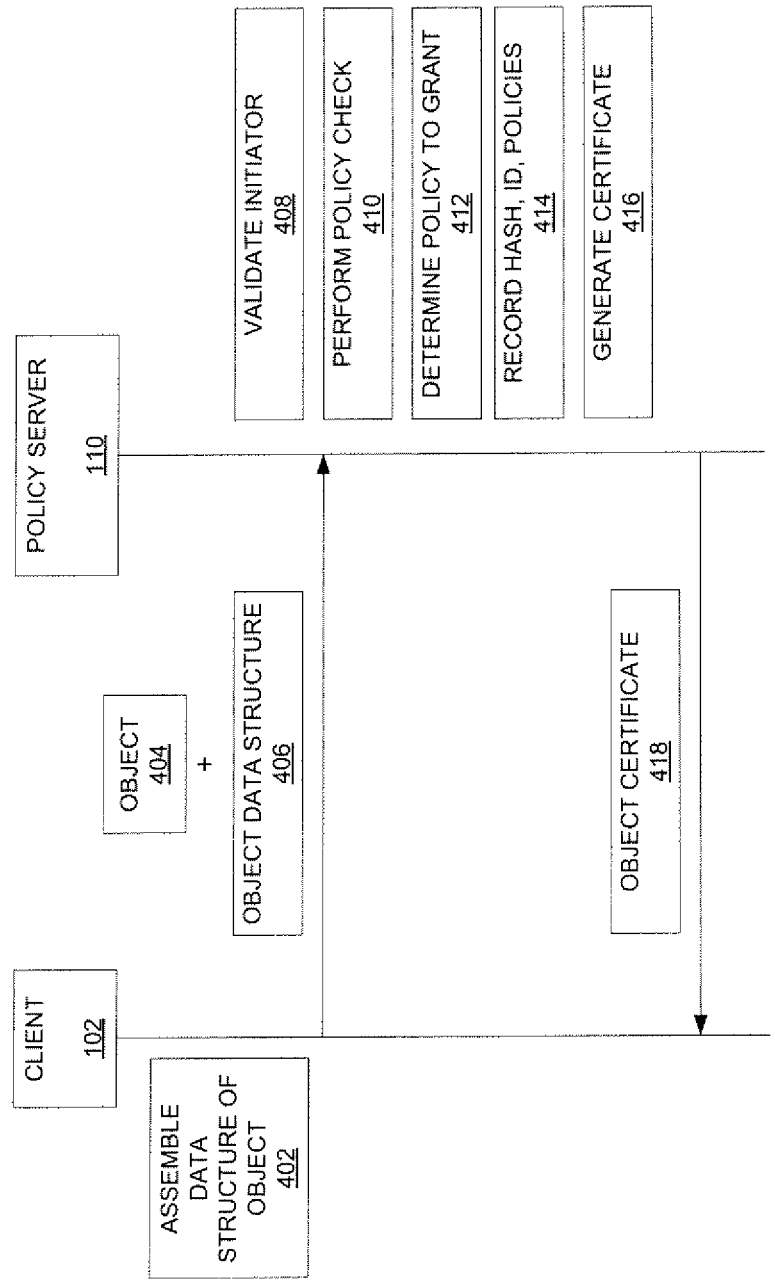
FIG. 4 is a ladder diagram illustrating one embodiment of a process of issuing a certificate for a certificate-based distributed policy enforcement.

FIG. 4 is a ladder diagram illustrating one embodiment of a process of issuing a certificate for a certificate-based distributed policy enforcement. When an object first enters the policy boundary (for example, when an email message is received from outside, or when a database record is first created), the object's initiator assembles a data structure related to the object at 402. Object 404 and object data structure 406 are sent to policy server 110. Policy server 110 validates that the initiator has the capabilities required to originate an object of the requested type at 408. Policy server 110 also performs further policy checks (for example, scanning for malware, objectionable content, security policy violations, etc) at 410. If the policy server decides that the object is valid, it then determines which policy requests to grant at 412. Once that decision is made, policy server 110 records the object's hash, the object initiator's unique identity, and the policies associated with the object at 414. Policy server 110 then associates a unique serial number with the object, and generates a certificate consisting of the serial number, the original hash, and its signature of these two items at 416. The object certificate 418 is returned to client 102.

Figure 5:
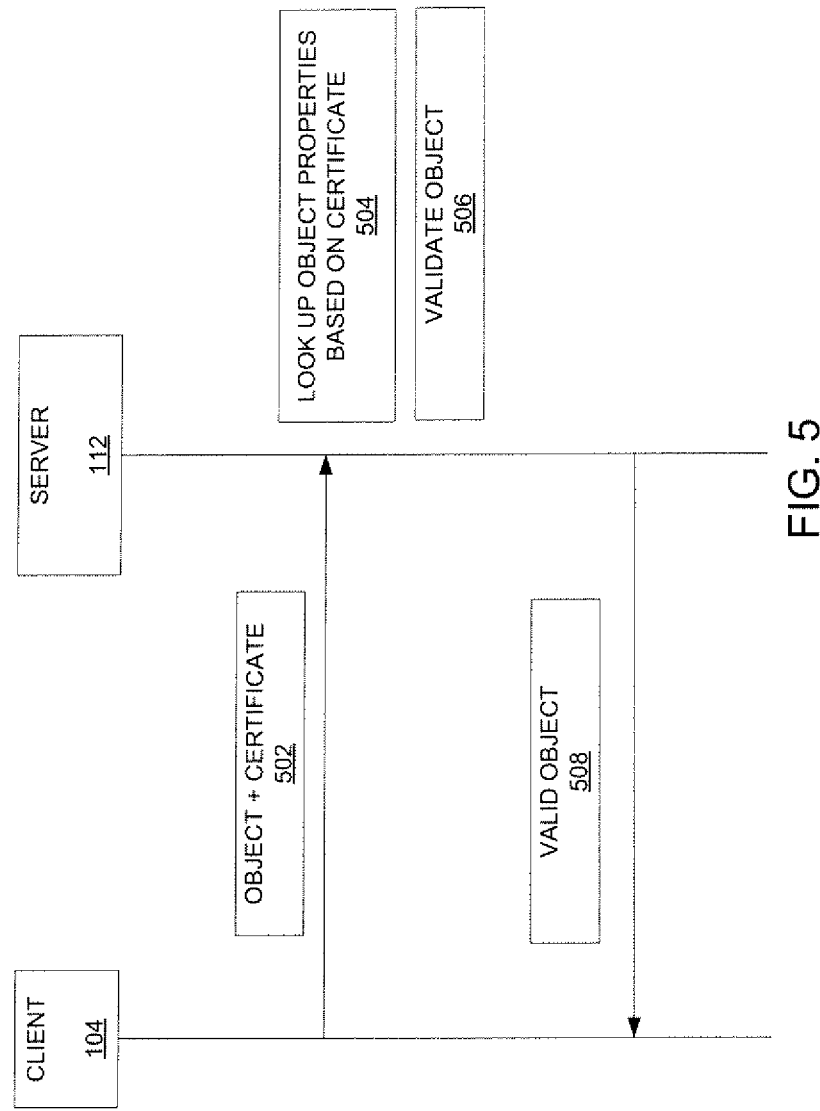
FIG. 5 is a ladder diagram illustrating one embodiment of a process of validating a certificate of a certificate-based distributed policy enforcement.

FIG. 5 is a ladder diagram illustrating one embodiment of a process of validating a certificate of a certificate-based distributed policy enforcement. A client 104 attempts to validate an object against policy server 112. The object and its certificate 502 are sent to policy server 112 which looks up object properties based on a previously issued certificate at 504. Policy server 112 then validates the object at 506 based on the validity of the certificate and sends the valid object 508 to the client 104.

Figure 6:
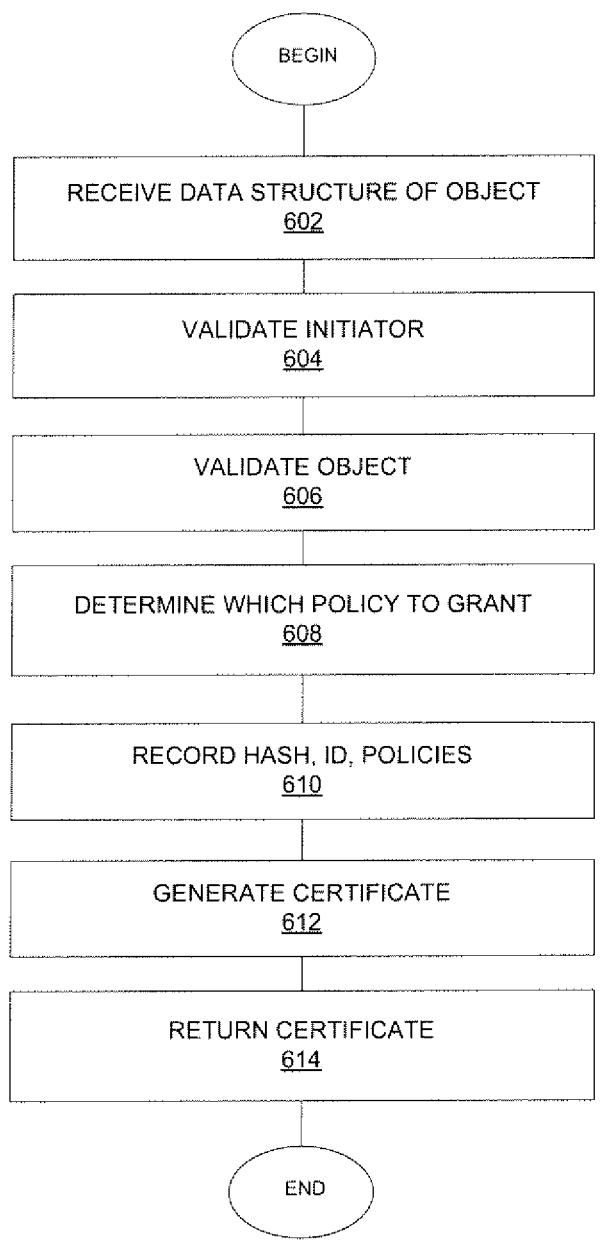
FIG. 6 is a flow diagram illustrating one embodiment of a method for issuing a certificate of a certificate-based distributed policy enforcement.

FIG. 6 is a flow diagram illustrating one embodiment of a method for issuing a certificate of a certificate-based distributed policy enforcement. At 602, a policy server receives a data structure of an object to be validated. At 604, the policy server validates that the initiator has the capabilities required to originate an object of the requested type. At 606, the policy server performs further policy checks (for example, scanning for malware, objectionable content, security policy violations, etc). If the policy server decides that the object is valid at 606, it then determines which policy requests to grant at 608. Once that decision is made, the policy server records the objects hash, the object initiators unique identity, and the policies associated with the object at 610. The policy server then associates a unique serial number with the object, and generates a certificate consisting of the serial number, the original hash, and its signature of these two items at 612. The object certificate is returned to client at 614.

Figure 7:
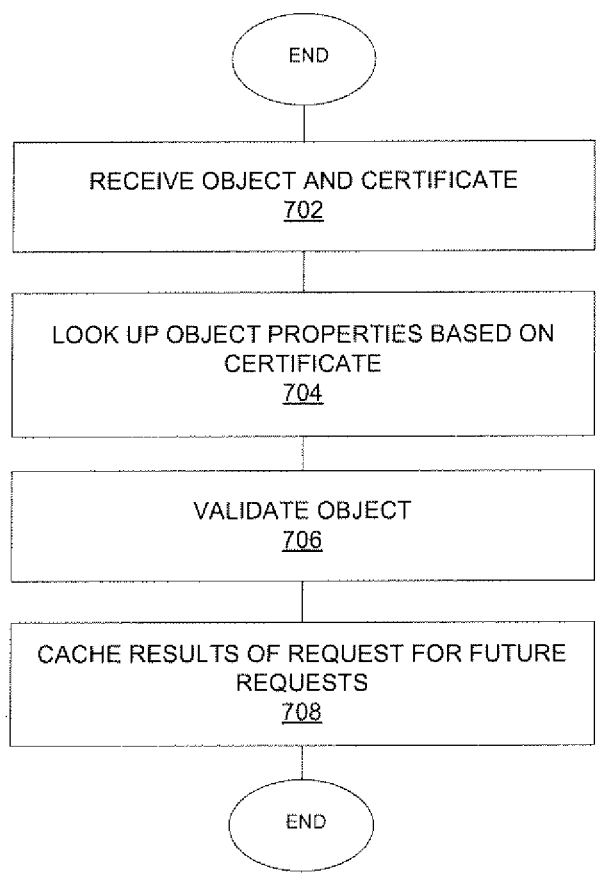
FIG. 7 is a flow diagram illustrating one embodiment of a method for validating a certificate of a certificate-based distributed policy enforcement.

FIG. 7 is a flow diagram illustrating one embodiment of a method for validating a certificate of a certificate-based distributed policy enforcement. At 702, a policy server receives an object to be validated against with a certificate. Policy server looks up object properties based on the certificate at 704. At 706, policy server validates the object if the certificate is valid. At 708, policy server can also cache results of the requests for future requests.

Figure 8:
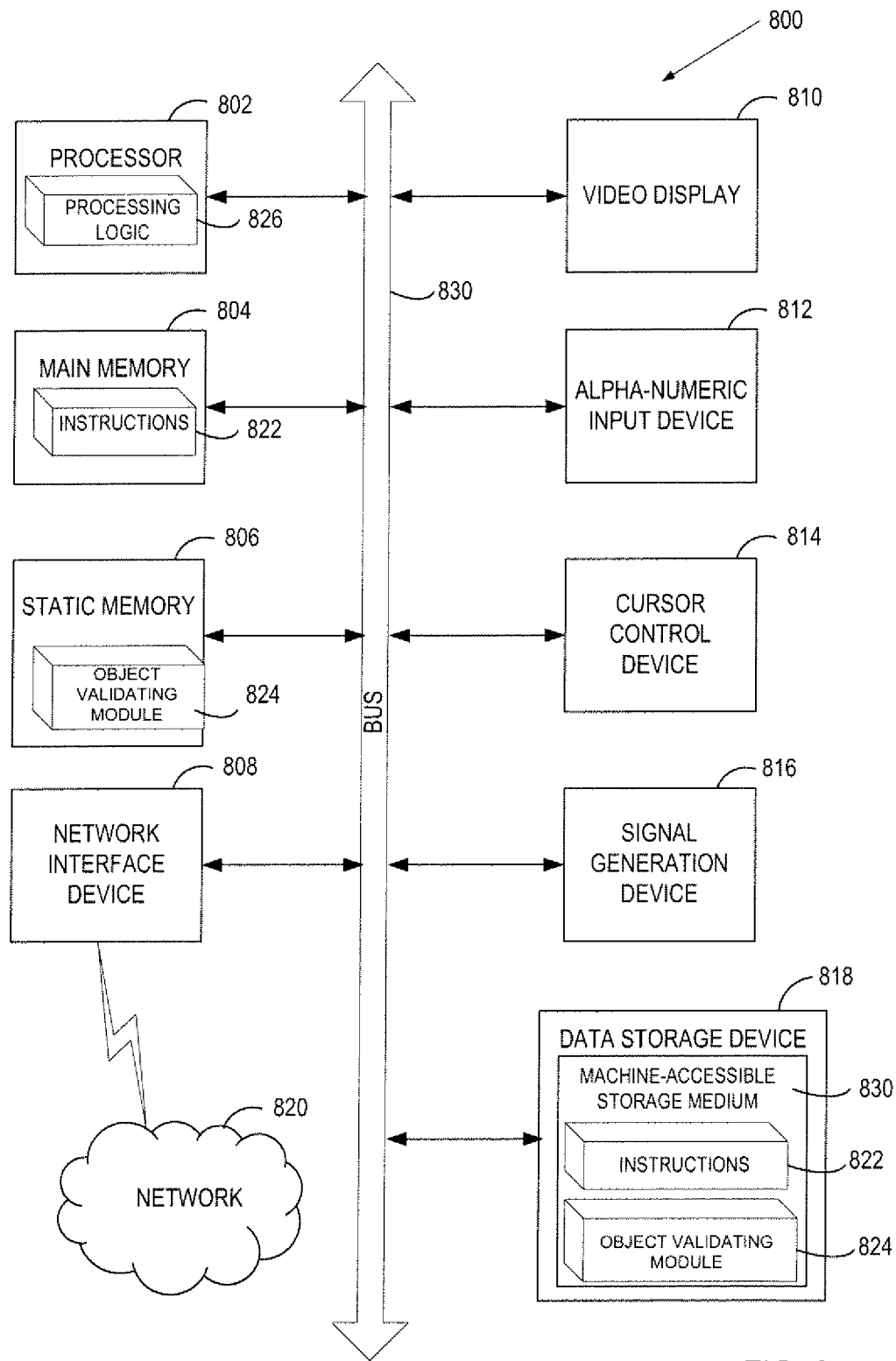
FIG. 8 is a block diagram illustrating an example of a computer system.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute modules 826 (previously described with respect to FIG. 1) for performing the operations and steps discussed herein with. In one embodiment, the modules may be include hardware or software or a combination of both.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-accessible storage medium 830 on which is stored one or more sets of instructions (e.g., software 822) embodying any one or more of the methodologies or functions described herein. The software 822 may also reside, completely or at least partially, within the main memory 804 and/or within the processing device 802 during execution thereof by the computer system 800, the main memory 804 and the processing device 802 also constituting computer-accessible storage media. The software 822 may further be transmitted or received over a network 820 via the network interface device 808.

The computer-accessible storage medium 830 may also be used to store the object validating module 824 as presently described. The object validating module 824 may also be stored in other sections of computer system 800, such as static memory 806.

While the computer-accessible storage medium 830 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to The appended claims, along with the full scope of equivalents to which such claims are entitled.

What is claimed is:

1. A method comprising:
   receiving, by a processing device from an initiator over a communication channel, an object and a data structure associated with the object that comprises a hash value of the object;
   determining a type of the object in view of the data structure;
   determining a set of types the initiator is associated with originating;
   determining that the type of the object is one of the set of types;
   validating the initiator in view of determining that the type of the object is one of the set of types;
   scanning the object for violation of one or more policies;
   validating the object in view of the scanning; and
   generating, by the processing device, an object certificate comprising an indication of a lifespan of the object and the hash value from the data structure associated with the object upon validating the initiator and validating the object.

2. The method of claim 1, wherein the data structure further comprises a serialized representation of public properties of the object and a signature of the public properties and the hash value using a private key of the initiator.

3. The method of claim 2, wherein the public properties comprise the type of the object, a request policy association, and the indication of the lifespan of the object.

4. The method of claim 2, wherein the hash value is unique and unambiguous.

5. The method of claim 2, further comprising:
   recording the hash value of the object, a unique identifier of the initiator of the object, and policies associated with the object; and
   associating a serial number with the object, wherein the object certificate comprises the serial number, the hash value of the object, and a signature of the serial number and the hash value of the object.

6. The method of claim 1, further comprising:
   receiving a request to validate the object; and
   validating the object in view of the object certificate.

7. The method of claim 1, wherein scanning the object comprises scanning the object for malware.

8. The method of claim 1, wherein scanning the object comprises scanning the object for objectionable content.

9. The method of claim 1, wherein scanning the object comprises scanning the object for security policy violations.

10. A non-transitory computer-readable medium, having instructions stored therein, which when executed by a processing device, cause the processing device to:
    receive, by the processing device from an initiator over a communication channel, an object and a data structure associated with the object that comprises a hash value of the object;
    determine a type of the object in view of the data structure;
    determine a set of types the initiator is associated with originating;
    determine that the type of the object is one of the set of types;
    validate the initiator in view of determining that the type of the object is one of the set of types;
    scan the object for violations of one or more policies;
    validate the object in view of the scanning; and
    generate, by the processing device, an object certificate comprising an indication of a lifespan of the object and the hash value from the data structure associated with the object upon validating the initiator and validating the object.

11. The non-transitory computer-readable medium of claim 10, wherein the data structure comprises a serialized representation of public properties of the object and a signature of the public properties and the hash value using a private key of the initiator.

12. The non-transitory computer-readable medium of claim 11, wherein the public properties comprise the type of the object, a request policy association, and the indication of the lifespan of the object.

13. The non-transitory computer-readable medium of claim 11, wherein the hash value is unique and unambiguous.

14. The non-transitory computer-readable medium of claim 11, wherein the processing device is further to:
    record the hash value of the object, a unique identifier of the initiator of the object, and policies associated with the object; and
    associate a serial number with the object, wherein the object certificate further comprises the serial number and a signature of the serial number and the hash value of the object.

15. The non-transitory computer-readable medium of claim 10, wherein the processing device is further to:
    receive a request to validate the object; and
    validate the object in view of the object certificate.

16. A system comprising:
    a memory;
    a processing device, operatively coupled to the memory, to:
      receive, from an initiator over a communication channel, an object and a data structure associated with the object that comprises a hash value of the object;
      determine a type of the object in view of the data structure;
      determine a set of types the initiator is associated with originating;
      determining that the type of the object is one of the set of types;
      validate the initiator in view of determining that the type of object is one of the set of types;
      scan the object for violation of one or more policies;
      validate the object in view of the scanning; and
      generate an object certificate comprising an indication of a lifespan of the object and the hash value from the data structure associated with the object upon validating the initiator and validating the object.

17. The system of claim 16, wherein the data structure comprises a serialized representation of public properties of the object and a signature of the public properties and hash using a private key of an initiator of the object.

18. The system of claim 17, wherein the public properties comprise the type of the object, a request policy association, and the indication of the lifespan of the object, and the hash value is unique and unambiguous.

19. The system of claim 16, wherein the processing device is further to:
    record the hash value of the object, a unique identifier of the initiator of the object, and policies associated with the object, and is to associate a serial number with the object, wherein the object certificate further comprises the serial number and a signature of the serial number and the hash of the object.

20. The system of claim 15, wherein processing device is further to:
  receive a request to validate the object; and
  validate the object in view of the object certificate.

* * * * *